United States Patent
Beet

(10) Patent No.: US 10,800,463 B2
(45) Date of Patent: Oct. 13, 2020

(54) AUTOMOTIVE TRAY AND ASSEMBLY METHOD

(71) Applicant: PATRIOT CAMPERS PTY. LTD., Molendinar (AU)

(72) Inventor: Jack Beet, Molendinar (AU)

(73) Assignee: PATRIOT CAMPERS HOLDINGS PTY LTD., Molendinar (AU)

( * ) Notice: Subject to any disclaimer, the term of this patent is extended or adjusted under 35 U.S.C. 154(b) by 0 days.

(21) Appl. No.: 16/188,470

(22) Filed: Nov. 13, 2018

(65) Prior Publication Data

US 2019/0193794 A1    Jun. 27, 2019

(30) Foreign Application Priority Data

Dec. 21, 2017  (AU) ................. 2017905111

(51) Int. Cl.
  *B62D 33/02*    (2006.01)
  *B62D 25/16*    (2006.01)
  *B62D 65/00*    (2006.01)
  *B62D 43/02*    (2006.01)
  *B62D 33/077*   (2006.01)
  *B62D 25/20*    (2006.01)

(52) U.S. Cl.
  CPC ........... *B62D 33/02* (2013.01); *B62D 25/168* (2013.01); *B62D 25/2054* (2013.01); *B62D 33/077* (2013.01); *B62D 43/02* (2013.01); *B62D 65/00* (2013.01)

(58) Field of Classification Search
  CPC ............................ B62D 33/02; B62D 25/2054
  USPC ............. 296/10, 184.1, 183.1, 181.3, 182.1, 296/100.02, 100.06
  See application file for complete search history.

(56) References Cited

U.S. PATENT DOCUMENTS

| | | | |
|---|---|---|---|
| 2,502,093 A | 3/1950 | Johnson | |
| 3,735,998 A * | 5/1973 | Green | B62D 21/20 280/795 |
| 3,856,344 A * | 12/1974 | Loeber | B62D 25/2054 296/204 |
| 4,707,016 A | 11/1987 | McDonald | |
| 4,735,448 A * | 4/1988 | Hart | B66D 1/00 254/323 |
| 4,758,128 A | 7/1988 | Law | |
| 6,371,719 B1 * | 4/2002 | Hildebrandt | B60P 1/435 14/69.5 |
| 8,491,031 B1 * | 7/2013 | Brown | B60P 1/26 296/100.02 |
| 9,272,740 B1 | 3/2016 | Portenier | |

(Continued)

FOREIGN PATENT DOCUMENTS

| | | |
|---|---|---|
| WO | 2017079789 | 5/2017 |
| WO | 2017124140 | 7/2017 |
| WO | 2018209393 | 11/2018 |

OTHER PUBLICATIONS

Australian Examination Report dated Aug. 29, 2019; Application No. 2018256634 in the name of Patriot Campers Pty Ltd.

*Primary Examiner* — Dennis H Pedder
(74) *Attorney, Agent, or Firm* — Tucker Ellis LLP

(57) ABSTRACT

The present invention provides a method for assembling an automotive tray assembly. The method involves capping at least one edge of a load-bearing tray to provide a safe edge and/or aesthetically pleasing finish. Preferably, the method involves using fasteners, including bolts or rivets for example, without the need for welding.

17 Claims, 3 Drawing Sheets

(56) References Cited

U.S. PATENT DOCUMENTS

2005/0067849 A1* 3/2005 Walkden ................ B62D 33/02
                                                          296/26.15
2005/0252999 A1* 11/2005 Truan .................... A01C 15/006
                                                          239/661
2011/0260486 A1* 10/2011 Thygesen .............. B62D 33/02
                                                          296/26.09

* cited by examiner

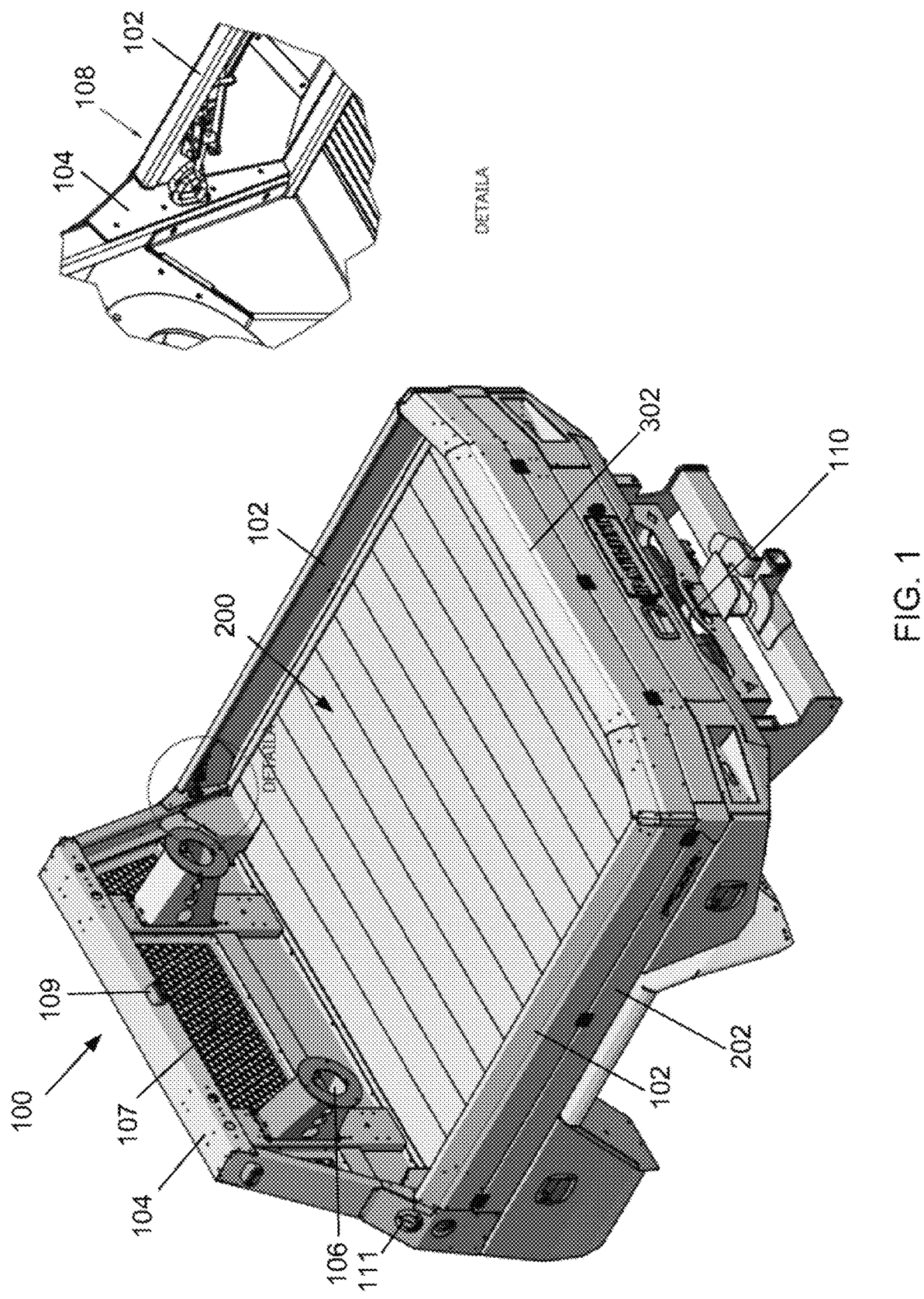

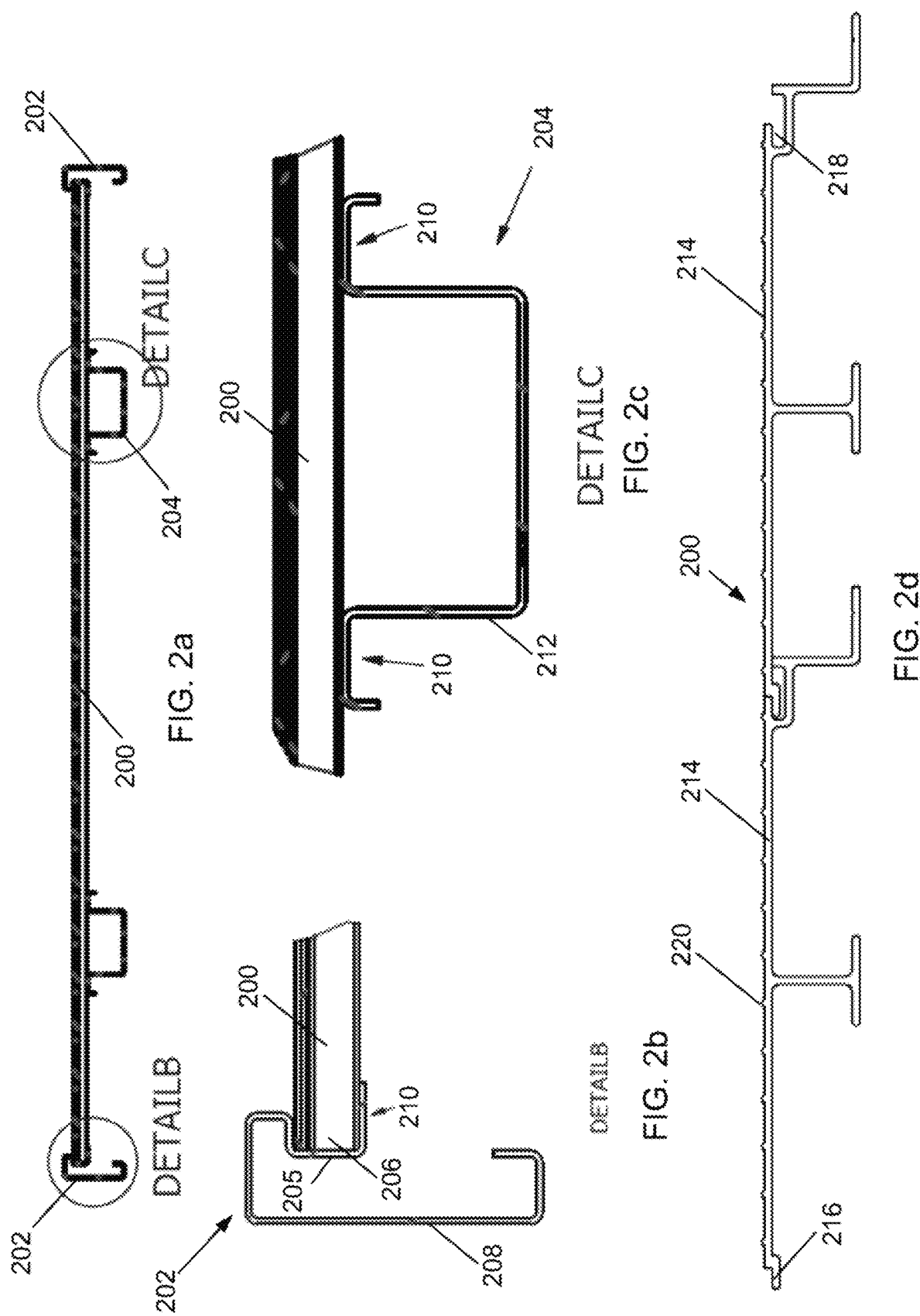

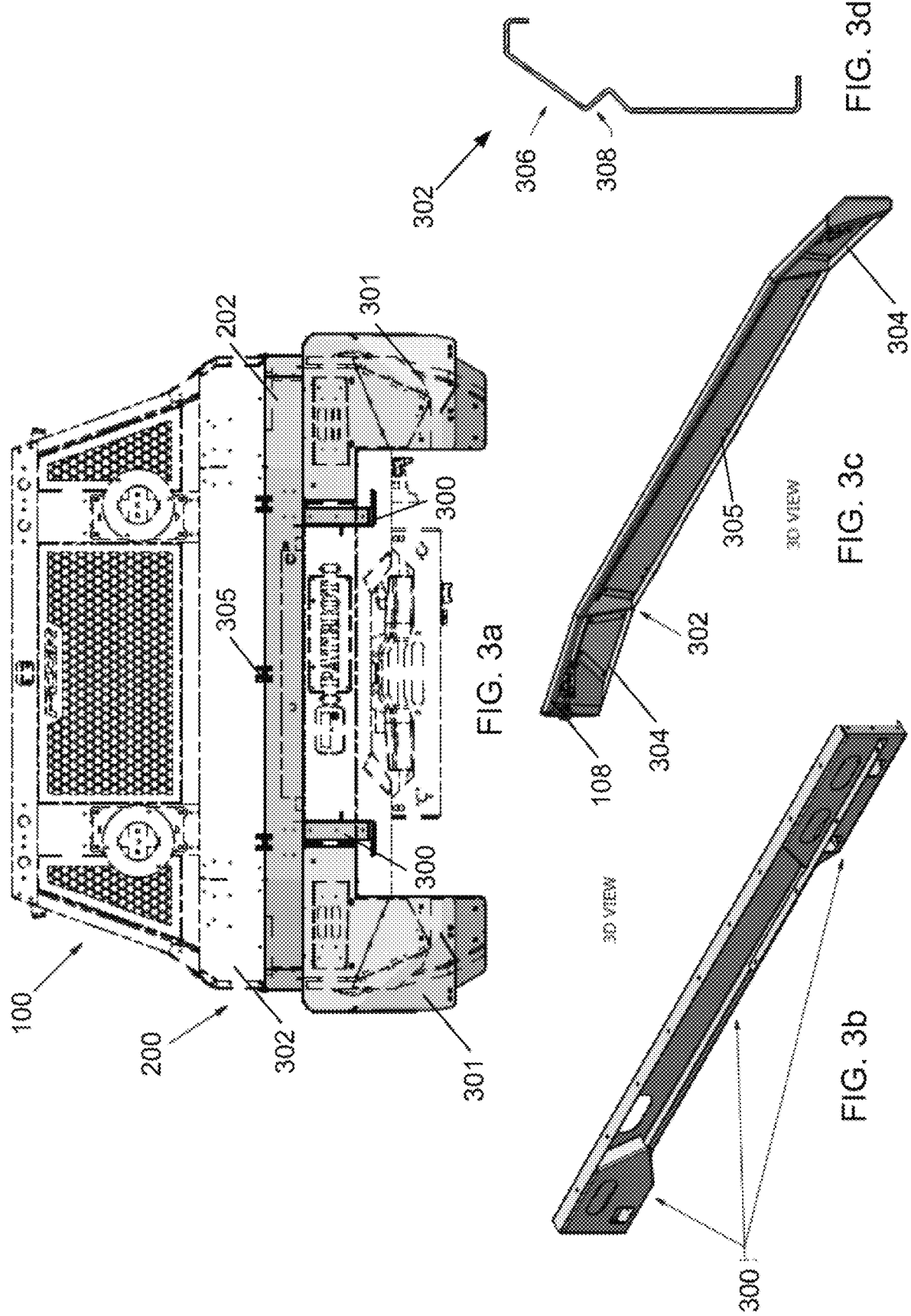

AUTOMOTIVE TRAY AND ASSEMBLY METHOD

TECHNICAL FIELD

The present invention generally relates to an automotive tray. The present invention has particular, although not exclusive application to a utility vehicle (i.e. a "ute").

BACKGROUND

The reference to any prior art in this specification is not, and should not be taken as an acknowledgement or any form of suggestion that the prior art forms part of the common general knowledge.

Utility vehicles ("Utes") are often used for four wheel driving and camping whereby camping gear is loaded onto the rear tray. Purpose built camping trays can be retro-fitted to utes, although are often labour and materials intensive to produce.

The preferred embodiment provides for an improved method for assembling an automotive tray assembly over know techniques.

SUMMARY OF THE INVENTION

According to another aspect of the present invention, there is provided an automotive tray assembly, the assembly including:
　a load-bearing tray; and
　capping for capping at least one edge of the tray.

The tray may include adjacent strips. Each strip may include interlocking formations for interlocking the strips together. The formations may cause the strips to resist lateral separation. The interlocking formations may include a tongue along one edge, and a groove for receiving a tongue along another edge. Each strip may include ribs. Each strip may be extruded and/or formed from aluminium so as to provide a lightweight yet durable construction. The tray may include chamfered rear corners.

The tray may include one or more mounts for mounting the assembly to a vehicle. Each mount may include a folded metal rib. The assembly may include one or more adaptors for adapting respective mounts to fit the vehicle. Each adaptor may include a rail. The rail may be formed from sheet metal. The sheet metal may be riveted together.

The capping may cap opposing edges of sides of the tray. The capping may include a pair of caps spanning the length of the tray. Each cap may define a recess for receiving the tray. The capping may include fascia which is larger than the cap. The fascia may be compliantly coupled to the cap. The fascia may define a channel. The capping may be formed from folded sheet metal.

The automotive tray assembly may further include a rear retainer for fitting to a rear of the tray. The retainer may taper inward relative to the tray. The assembly may further include a pair of flared mud flaps for mounting to either side of the tray. Each mud flap may protrude laterally from the tray.

The assembly may further include a headboard extending from the front of the tray. The headboard may include one or more spare tyre mounts. The assembly may further include one or more retainers extending from the headboard and for retaining goods on the tray. The retainers may be pivotally fastened to the tray. The assembly may further include locks for locking the retainers in a retaining position. The assembly may include a winch mount at the rear of the tray.

According to another aspect of the present invention, there is provided a method for assembling an automotive tray assembly, the method involving:
　capping at least one edge of a load-bearing tray.

Advantageously, the edge of the tray may be capped to provide a safe edge and aesthetically pleasing finish.

The method may involve forming the tray by arranging adjacent strips. The strips may be cut to the same length. The method may involve interlocking the strips. The method may involve extruding the strips.

The method may involve forming the capping by folding sheet-metal. The step of capping may involve receiving the tray in a recess of the capping and then fastening the capping to the received tray. The method may involve capping both sides of the tray so that ends of adjacent strips of the tray align.

The method may involve attaching mounts for mounting the assembly to a vehicle to the underside of the tray. The method may involve folding sheet metal to form each mount. The method may involve forming adaptors for adapting respective mounts to fit the vehicle. Each adaptor may be formed by riveting sheet together.

The method may involve fitting a rear retainer to a rear of the tray. The method may involve fitting a pair of mud flaps to either side of the tray.

The method may involve fitting a headboard at the front of the tray. The method may involve fitting retainers extending from the headboard. The method may involve fitting locks for locking the retainers in a retaining position. Method may involve fitting a winch mount at the rear of the tray.

The method may involve using fasteners, without the need for welding. The fasteners may include bolts or rivets.

According to another aspect of the present invention, there is provided an automotive tray assembly, the assembly including:
　alignment means for aligning adjacent strips to form an edge of a load-bearing tray.

According to another aspect of the present invention, there is provided a method for assembling an automotive tray assembly, the method involving:
　aligning adjacent strips to form an edge of a load-bearing tray.

According to another aspect of the present invention, there is provided an automotive tray assembly, the assembly including:
　interlocking means for interlocking adjacent strips to form a load-bearing tray.

According to another aspect of the present invention, there is provided a method for assembling an automotive tray assembly, the method involving:
　interlocking adjacent strips to form a load-bearing tray.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1 is a perspective view of an automotive tray assembly in accordance with an embodiment of the present invention;

FIG. 2a is a sectional rear end view of a tray arrangement of the automotive tray assembly of FIG. 1;

FIG. 2b is a detail view of a capping arrangement of the tray arrangement of FIG. 2a;

FIG. 2c is a detail view of a mount arrangement of the tray arrangement of FIG. 2a;

FIG. 2d is a sectional side view of adjacent tray strips of the tray arrangement of FIG. 2a;

FIG. 3a is a rear view of the automotive tray assembly of FIG. 1;

FIG. 3b is a perspective view of a mounting adaptor of the automotive tray assembly of FIG. 1;

FIG. 3c is a rear perspective view of a rear retainer of the automotive tray assembly of FIG. 1; and FIG. 3d is a sectional view of the rear retainer of FIG. 3c.

DETAILED DESCRIPTION OF PREFERRED EMBODIMENTS

According to an embodiment of the present invention, there is provided an automotive tray assembly 100, as shown in FIG. 1, for retro-fitting to a vehicle (e.g. ute).

Turning to FIG. 2a, the assembly 100 includes a load-bearing tray 200 upon which a payload is loaded, and capping 202 for capping the opposing edges of sides of the tray 200. The tray 200 also includes a pair of universal mounts 204 for mounting the assembly 100 to the vehicle.

Turning to FIG. 2b, the capping 202 includes a pair of inner caps 205 spanning the entire length of the tray 200. Each cap 205 defines a recess 206 for receiving the tray 200. The capping 202 further includes outer fascia 208 which is larger than the cap 205. The fascia 208 defines a channel for improved strength and is compliantly and resiliently coupled to the cap 205 so as to have some give in the event of impact. The capping 202 is formed from folded aluminium sheet metal. A bolt fastener 210 fastens the capping 202 to the tray 200.

Turning to FIG. 2c, each generic mount 204 includes a folded metal rib 212 formed from sheet metal. Once again, bolt fasteners 210 fasten the mounts 204 to the tray 200.

Turning to FIG. 2d, the tray 200 includes adjacent strips 214. Each strip 214 includes interlocking formations 216, 218 for interlocking the adjacent strips 214 together so that they resist lateral separation in the plane of the tray 200 from front to back. The interlocking formations include a tongue 216 along one edge, and a groove 218 for receiving a stepped tongue along another edge. Each strip 214 also includes upper traction ribs 220. Each strip 214 is extruded from aluminium so as to provide a lightweight yet durable construction.

Turning to FIG. 3a, the tray assembly 100 includes a pair of mounting adaptors 300 for adapting respective mounts 204 to fit the vehicle. The adaptors 300 are vehicle specific, and are sandwiched between the vehicle chassis and the mounts 204. The assembly 100 further includes a pair of flared mud flaps 301 for mounting to either side of the tray 200. Each mud flap protrudes laterally from the tray 200 to cover wider wheels.

Turing to FIG. 3b, each adaptor 300 is in the form of a rail formed from sheet metal that is riveted together with rivets.

Turing to FIG. 3c, the automotive tray assembly 100 further includes a rear retainer 302 for fitting to a rear of the tray 200. The base of the retainer 302 is concave in shape to fit chamfered rear corners 304 of the tray 200. The base also includes bolted on hinges 305 for attachment to the rear capping 202. The endmost flanks or braces of the retainer 302 are riveted to the central spine.

Turing to FIG. 3d, the folded sheet-metal rear retainer 302 has a tapered upper portion 306 to facilitate tray loading and strengthening folds 308.

Returning to FIG. 1, the assembly 100 further includes two straight side retainers 102, having the same cross section as the rear retainer 108 shown in FIG. 3d. The assembly 100 further includes an aluminium folded sheet-metal headboard 104 extending from the front of the tray 200. The headboard 104 includes a pair of adjustable spare tyre mounts 106 extending from a perforated sheet metal screen 107. Rear-facing LED lighting 109 is mounted to the top of the headboard 102. The base of the headboard 102 includes inlets 111 for receiving fuel and water stored in onboard tanks.

The sidewall retainers 102 extend from the headboard 104 and retain loaded goods on the tray 200. The retainers 102, 302 are removable, and pivotally fastened to the capping 202 with hinges 305. The assembly 100 further includes locks 108 for locking the retainers 102, 302 in the shown upright retaining positions. The locks 108 include latches locking into laser cut tangs.

The assembly 100 also includes a recessed winch mount 110 beneath the rear of the tray 200.

A method for assembling the automotive tray assembly 110 is now briefly described.

Initially, the tray strips 214 are extruded and cut to the same length. The capping 202 is formed by cutting and then folding sheet-metal.

The strips 214 are arranged adjacently and interlocked together (FIG. 2d) to form the tray 200.

The side and back edges of the tray 200 are capped with the capping 202 to provide a safe edge and an aesthetically pleasing finish (FIG. 2b). Ends of adjacent strips 214 of the tray 200 are conveniently aligned in the capping 202. The tray 200 is received in a recess of the capping 202 and then fastened in place by bolting through the capping 202.

The vehicle mounts 204 are formed by folding sheet metal and then mounting to the underside of the tray 200 (FIG. 2c).

The headboard 104 is formed and bolted to the front of the tray 200. The side and rear retainers 102, 302 are hinged to the tray 200, and locks are fitted to lock the retainers 102, 302 in the retaining position (FIG. 1).

The mud flaps 301 are fitted to either side of the tray (200) as shown in FIG. 3a, and the winch mount is fitted at the rear of the tray (FIG. 1).

The adaptors 300 are formed by riveting sheet together (FIG. 3b). Each adaptor is used the fit the completed assembly 100 to the vehicle.

The foregoing assembly method involves using bolt and rivet fasteners, without the need for any welding.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The claims defining the invention are as follows:

1. An automotive tray assembly, the assembly including:
    a load-bearing tray including adjacent extruded cut strips, wherein each strip includes interlocking formations for interlocking the strips together; and
    capping for capping at least one edge of the tray, wherein the capping is formed by folding sheet-metal, and wherein the capping is formed to include:
        an inner cap spanning the length of the tray, wherein the inner cap defines a recess for receiving the tray; and
        a fascia which is larger than the inner cap and is resiliently coupled to the inner cap.

2. An automotive tray assembly as claimed in claim 1, wherein the interlocking formations cause the strips to resist lateral separation.

3. An automotive tray assembly as claimed in claim 1, wherein the tray includes chamfered rear corners.

4. An automotive tray assembly as claimed in claim 1, wherein the tray includes one or more mounts including folded ribs for mounting the assembly to a vehicle.

5. An automotive tray assembly as claimed in claim 4, including one or more adaptors for adapting respective mounts to fit the vehicle, each adaptor including a rail formed from sheet metal riveted together.

6. An automotive tray assembly as claimed in claim 1, wherein the capping caps opposing edges of sides of the tray, the capping including another inner cap spanning the length of the tray and defining a recess for receiving the tray and a fascia which is larger than the another inner cap, and is resiliently coupled to the another inner cap.

7. An automotive tray assembly as claimed in claim 1, further including:
    a rear retainer for fitting to a rear of the tray, the retainer tapering inward relative to the tray;
    a pair of flared mud flaps for mounting to either side of the tray, each mud flap may protrude laterally from the tray; and
    a headboard extending from the front of the tray, the headboard including one or more spare tyre mounts extending from the headboard and for retaining goods on the tray.

8. An automotive tray assembly as claimed in claim 1, wherein the interlocking formations include a tongue along one edge, and a groove for receiving a tongue along another edge.

9. A method for assembling an automotive tray assembly, the method involving:
    forming a load-bearing tray by arranging adjacent extruded strips cut to the same length;
    interlocking the strips; and
    capping at least one edge of the load-bearing tray with a capping to provide a safe edge and aesthetically pleasing finish, wherein the capping is formed by folding sheet-metal, and wherein the capping is formed to include:
        an inner cap spanning the length of the tray, wherein the inner cap defines a recess for receiving the tray; and
        a fascia which is larger than the inner cap and is resiliently coupled to the inner cap.

10. A method as claimed in claim 9, wherein the step of capping involves:
    receiving the tray in a recess of the capping and then fastening the capping to the received tray; and
    capping both sides of the tray so that ends of adjacent strips of the tray align.

11. A method as claimed in claim 9, further involving attaching mounts for mounting the assembly to a vehicle to the underside of the tray.

12. A method as claimed in claim 11, further involving folding sheet metal to form each mount.

13. A method as claimed in claim 9, further involving forming adaptors for adapting respective mounts to fit the vehicle, each adaptor being formed by riveting sheet together.

14. A method as claimed in claim 9, further involving fitting:
    a rear retainer to a rear of the tray; and
    a pair of mud flaps to either side of the tray.

15. A method as claimed in claim 9, further involving fitting a headboard at the front of the tray, and retainers extending from the headboard.

16. A method as claimed in claim 9, further involving fitting a winch mount at the rear of the tray.

17. A method as claimed in claim 9, further involving using fasteners, including bolts and rivets.

* * * * *